(No Model.)
E. OVER.
NUT GUARD.
No. 325,762. Patented Sept. 8, 1885.
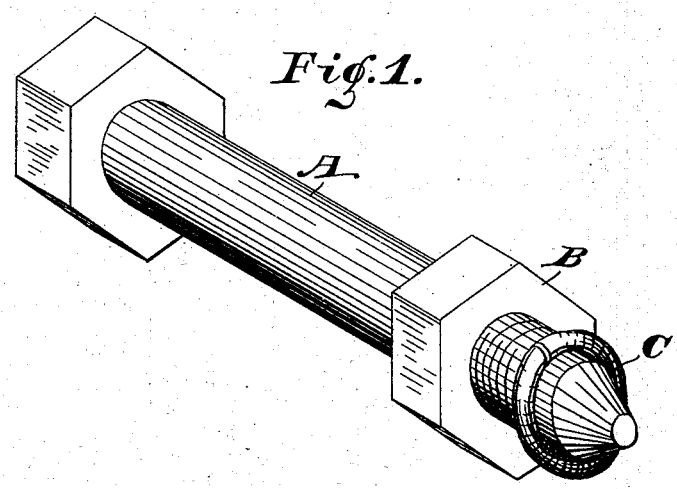
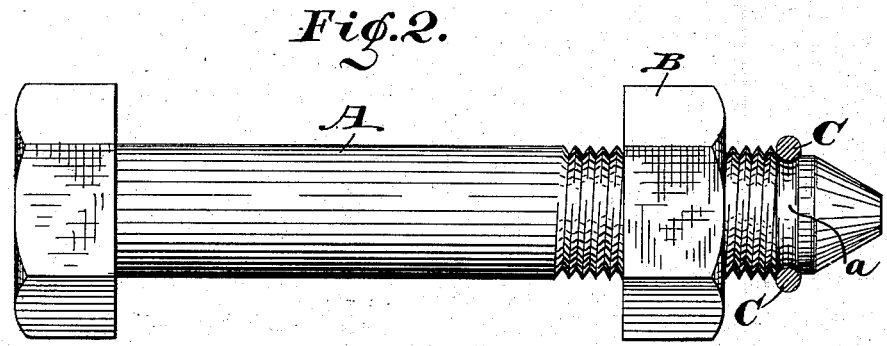
WITNESSES.
Chas N. Leonard.
E. W. Bradford,
INVENTOR.
Ewald Over,
PER
C. Bradford,
ATTORNEY.
N. PETERS. Photo-Lithographer, Washington, D. C.

UNITED STATES PATENT OFFICE.

EWALD OVER, OF INDIANAPOLIS, INDIANA.

NUT-GUARD.

SPECIFICATION forming part of Letters Patent No. 325,762, dated September 8, 1885.

Application filed November 12, 1884. (No model.)

*To all whom it may concern:*

Be it known that I, EWALD OVER, of the city of Indianapolis, county of Marion, and State of Indiana, have invented certain new and useful Improvements in Nut-Guards, of which the following is a specification.

My said invention principally consists in forming a groove near the point of a bolt and providing a ring adapted to enter said groove, whereby, after a nut is put on the bolt and said ring put in place in the groove, the nut will be prevented from coming off the bolt until said ring is removed, as will be presently more fully described.

Referring to the accompanying drawings, which are made a part hereof, and on which similar letters of reference indicate similar parts, Figure 1 is a perspective view of a bolt bearing a nut provided with my invention; and Fig. 2 is a side elevation of the same, the ring being shown in section.

In said drawings, the portions marked A represent the bolt, B the nut, and C the ring.

The bolt A is or may be in most respects any ordinary bolt. Near the point it is provided with a circumferential groove, $a$, and its point below said groove should be pointed, as shown. It is also preferably reduced in size between the groove and the point, as shown most plainly in Fig. 2, so that there shall be no thread below the groove.

The nut B need have no peculiarities.

The ring C is preferably formed of spring-wire, open, and of a size to fit tightly into the groove $a$, with its periphery projecting beyond the surface of the bolt, so as to prevent the nut from passing over it when in place.

The operation is as follows: The nut is first screwed onto the bolt in the ordinary manner. The ring C is then forced over the pointed or conical end into the groove $a$, into which it is drawn and held by its inherent spring force, and thus prevents the nut from coming off. The ring is generally forced into position by the aid of a concave pointed set adapted to fit over the conical point of the bolt.

This device is not intended for a nut-lock, (although it may so serve if the nut comes to just the right point on the bolt,) but simply as a guard to prevent nuts from getting lost.

Having thus fully described my said invention, what I claim as new, and desire to secure by Letters Patent, is—

1. The combination, with a bolt having a groove near its point, of a ring adapted to enter said groove and form a nut-guard.

2. The combination, with a bolt having a conical point and a groove, $a$, of a ring, C, substantially as described, and for the purposes specified.

3. The combination of a bolt having a groove, and reduced in size between the groove and point, and a ring adapted to enter said groove, substantially as set forth.

4. The combination of the bolt A, having groove $a$, a conical point, and a portion between said groove and said conical point smaller than the body of the bolt, and a ring, C, adapted to be placed in said groove and form a nut-guard, substantially as set forth.

In witness whereof I have hereunto set my hand and seal at Indianapolis, Indiana, this 8th day of November, A. D. 1884.

EWALD OVER. [L. S.]

In presence of—
C. BRADFORD,
E. W. BRADFORD.